United States Patent [19]
Wiezer et al.

[11] 4,168,260
[45] Sep. 18, 1979

[54] N-SUBSTITUTED TRIAZA-ADAMANTANYL UREAS AS STABILIZERS FOR THERMOPLASTIC MATERIALS

[75] Inventors: Hartmut Wiezer, Gersthofen; Gerhard Pfahler, Augsburg; Norbert Mayer, Gablingen, all of Fed. Rep. of Germany

[73] Assignee: Hoechst Aktiengesellschaft, Frankfurt am Main, Fed. Rep. of Germany

[21] Appl. No.: 869,826

[22] Filed: Jan. 16, 1978

[30] Foreign Application Priority Data

Jan. 20, 1977 [DE] Fed. Rep. of Germany ....... 2702205

[51] Int. Cl.$^2$ .................... C07D 251/72; C08K 5/34
[52] U.S. Cl. .................... 260/45.8 NT; 260/45.7 PH; 260/45.7 S; 260/45.85 B; 544/180
[58] Field of Search ............. 260/45.8 NT(U.S. only); 544/180

[56] References Cited

U.S. PATENT DOCUMENTS

| | | | |
|---|---|---|---|
| 2,985,619 | 5/1961 | Roos et al. | 260/45.8 NT |
| 3,301,854 | 1/1967 | Gabel | 544/180 |
| 3,575,974 | 4/1971 | Hodge et al. | 544/180 |
| 3,957,780 | 5/1976 | Grossmann | 260/45.8 NT |
| 4,012,384 | 3/1977 | Nielsen | 544/180 |
| 4,082,723 | 4/1978 | Mayer et al. | 260/45.8 NT |

OTHER PUBLICATIONS

Saunders et al., "Polyurethanes", Part 1, 1965, p. 65.

*Primary Examiner*—Hosea E. Taylor
*Assistant Examiner*—R. A. White
*Attorney, Agent, or Firm*—Connolly and Hutz

[57] ABSTRACT

The invention relates to a process for the stabilization of halogen-free or halogen-containing synthetic polymers against the degradation by light and heat, which comprises the addition of special 1,3,5-triaza-7-adamantanyl ureas to the polymers.

5 Claims, No Drawings

N-SUBSTITUTED TRIAZA-ADAMANTANYL UREAS AS STABILIZERS FOR THERMOPLASTIC MATERIALS

The present invention relates to N-substituted triaza-adamantanyl ureas as stabilizers for thermoplastic materials.

Due to their favorable physical properties, synthetic polymers are used in various fields of application. However, owing to their poor fastness to light and heat, they are impaired or even degraded by any type of radiation, above all by UV light, which becomes evident by an increasing embrittlement and simultaneous darkening.

It has now been found that N-substituted triaza-adamantanyl ureas are excellently suitable for the stabilization of synthetic polymers.

The present invention therefore provides a process for the stabilization of halogen-free or halogen-containing synthetic polymers against the degradation by light and heat, which comprises adding to the polymers 1,3,5-triaza-7-adamantanyl ureas of the formula

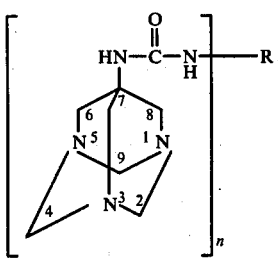

in which n is 1 or 2 and R represents a mono- or bivalent hydrocarbon radical—depending on the meaning of n -, which may be:

(a) an alkyl or isoalkyl radical having from 1 to 20 carbon atoms and/or an alkylene or isoalkylene radical having from 2 to 20 carbon atoms, or (b) an alkenyl or isoalkenyl radical having from 3 to 20 carbon atoms, or (c) a cycloalkyl radical having from 5 to 14 carbon atoms which may be substituted by halogen, $C_1$–$C_{12}$-alkyl, or an alkoxy group having from 1 to 4 carbon atoms, or (d) an aryl and/or arylene radical with 6 or 10 carbon atoms, which may be substituted by halogen, $C_1$–$C_{12}$-alkyl, or an alkoxy group of from 1 to 4 carbon atoms, or (e) an aralkyl and/or aralkylene radical of from 7 to 18 carbon atoms, in an amount in the range of from 0.01 to 5.0 parts by weight, calculated on 100 parts by weight of polymer.

The invention also relates to halogen-free or halogen-containing synthetic polymer compositions which contain a compound of the formula (I), furthermore, to the aza-adamantanyl ureas of the formula II

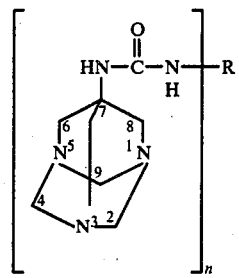

in which n is 1 or 2 and R represents a mono- or bivalent hydrocarbon radical—depending on the meaning of n -, which may be:

(a) an alkyl or isoalkyl radical having from 1 to 20 carbon atoms and/or an alkylene or isoalkylene radical having from 2 to 20 carbon atoms, or (b) an alkenyl or isoalkenyl radical having from 3 to 20 carbon atoms, or (c) a cycloalkyl radical having from 5 to 14 carbon atoms which may be substituted by halogen, $C_1$–$C_{12}$-alkyl, or an alkoxy group having from 1 to 4 carbon atoms, or (d) a naphthyl radical or an aryl and/or arylene radical with 6 or 10 carbon atoms substituted by halogen, $C_1$–$C_{12}$-alkyl, or an alkoxy group of from 1 to 4 carbon atoms, or (e) an aralkyl and/or aralkylene radical of from 7 to 18 carbon atoms, which have not been described so far and which exclude the compound in which the substituent R represents a phenyl radical (as it is known from J.Org.Chem. 37 (1972) 2, pages 320/21), as well as to the preparation of the novel aza-adamantanyl ureas.

In the 1,3,5-triaza-7-adamantanyl ureas of the formula (I) to be used according to the invention, R represents—if n is 1—an unsubstituted or substituted monovalent hydrocarbon radical of from 1 to 20 carbon atoms. If n is 2, R represents a bivalent unsubstituted or substituted hydrocarbon radical of 2 to 20 carbon atoms. Preference is given to those compounds in which—if n is 1—$R^1$ is an alkyl or isoalkyl radical of from 1 to 18 carbon atoms, an alkenyl or isoalkenyl radical of from 3 to 18 carbon atoms, a substituted or unsubstituted cycloalkyl radical of from 5 to 14 carbon atoms, a substituted or unsubstituted aryl radical of 6 or 10 carbon atoms, or an aralkyl radical of from 7 to 18 carbon atoms. As possible substituent of the above-mentioned cyclic radicals there may be mentioned: Halogen, preferably chlorine, $C_1$–$C_{12}$-alkyl, or alkoxy of from 1 to 4 carbon atoms. If n is 2, R represents an alkylene or isoalkylene radical of from 2 to 20 carbon atoms, a substituted or unsubstituted arylene radical having 6 or 10 carbon atoms or an aralkylene radical of from 7 to 18 carbon atoms. In this case, too, appropriate substituents for cycloalkyl and aryl are halogen, $C_1$–$C_{12}$-alkyl or alkoxy of from 1 to 4 carbon atoms.

Particularly preferred are those 1,3,5-triaza-7-aminoadamantanyl ureas in which—if n is 1—R stands for $C_4$–$C_{18}$-alkyl or -isoalkyl, for a cycloalkyl group of from 5 to 7 carbon atoms optionally substituted by $C_1$–$C_4$-alkyl, or for an aryl radical having 6 or 10 carbon atoms and being optionally substituted by chlorine or by $C_1$–$C_4$-alkyl, or for an aralkyl group of from 7 to 11 carbon atoms. If n is 2, those ureas are particularly preferred in which R is a straight-chained or branched alkylene radical of from 2 to 12 carbon atoms or an arylene radical with 6 or 12 carbon atoms, which may also be substituted by chlorine or a $C_1$–$C_4$-alkyl group, or R stands for an aralkylene radical of from 7 to 11 carbon atoms.

Examples for R—with n being 1—are the following: Methyl, ethyl, propyl, isopropyl, n-butyl, sec.-butyl, tert.-butyl, n-pentyl, 2-methylpentyl, 2-ethylpentyl, n-hexyl, n-heptyl, n-octyl, n-decyl, n-dodecyl, n-octadecyl, allyl, n-decenyl, n-octadecenyl, cyclopentyl, cyclohexyl, methylcyclohexyl, cycloheptyl, phenyl, tolyl, mesityl, chlorophenyl, butylphenyl, α- and β-naphthyl. Examples for R—with n being 2—are the following: 1,2-Ethylene, 1,4-n-butylene, 1,6-hexylene, 1,10-n-decylene, 1,12-n-dodecylene, 2,4-toluylene.

As has already been mentioned, of the compounds to be used in accordance with the invention there is known the compound in which R is phenyl, however, the triaza-adamantanyl ureas characterized by the general formula (II) are to be considered as being novel. In the following there have been indicated some typical representatives of the novel compounds:

N-t.-butyl-N'-(1,3,5-triaza-7-adamantyl)-urea,
N-cyclohexyl-N'-(1,3,5-triaza-7-adamantyl)-urea,
N-octadecyl-N'-(1,3,5-triaza-7-adamantyl)-urea,
N-3-chlorophenyl-N'-(1,3,5-triaza-7-adamantyl)-urea,
N-4-chlorophenyl-N'-(1,3,5-triaza-7-adamantyl)-urea,
N-β-naphthyl-N'-(1,3,5-triaza-7-adamantyl)-urea,
N-hexane-1',6'-bis-(7-carbamoyl-1,3,5-triaza-adamantyl-amine-7).

The compounds to be used according to the invention are prepared by reacting 7-amino-1,3,5-triaza-adamantane with isocyanates according to the following reaction equation:

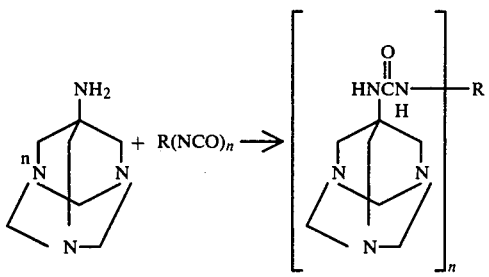

In the course of this process the amino compound is introduced in 2 to 10 times the amount by weight of an inert organic solvent, for example a liquid aromatic or aliphatic hydrocarbon or a chlorinated hydrocarbon, and the isocyanate optionally dissolved in 2 to 5 times the amount by weight of the same solvent is added dropwise at a temperature in the range of from 20° to 150° C., preferably from 20° to 50° C. In order to complete the reaction, the mixture is continued to be stirred for 1 to 10 hours. The desired products usually precipitate in the form of solid substances from the reaction solutions and may be obtained by way of filtration. They can be purified by recrystallization.

The 1,3,5-triaza-7-adamantanyl ureas are added to the polymer masses to be stabilized generally in an amount in the range of from 0.01 to 5, preferably from 0.05 to 3 and especially from 0.1 to 1.5 parts by weight, calculated on 100 parts by weight of the polymer. It is possible to use a compound alone or in admixture with several compounds. The amount to be used in the individual case depends also on the kind and the properties of the respective polymer, as well as on the special purpose of application and the presence of further co-stabilizers.

By synthetic polymer compositions there are to be understood halogen-free and halogen-containing homo- and copolymers, in particular homopolymers of olefins, dienes and styrene, for example polyethylene of a low and high density, polypropylene, polystyrene, polybutadiene and polyisoprene, copolymers or olefins, dienes and styrene with one another or with other olefinically unsaturated monomers, such as ethylene-propylene copolymers, ethylene-butene copolymers, styrene-butadiene copolymers, ethylene-vinyl acetate copolymers and acrylonitrile-butadiene-styrene copolymers, homopolymers of vinyl chloride and vinylidene chloride and copolymers of these monomers with one another and with other olefinically unsaturated monomers. There are also to be included polyurethanes, polyacetals, polyesters, polyamides, polyacrylates, and epoxy resins. Preference is given to poly-α-olefins, such as polyethylenes and especially polypropylenes, as well as to the polymers of vinyl chloride.

The stabilizers according to the invention are incorporated into the polymer compositions according to methods that are generally common. Alternatively, it is also possible to mix a solution, suspension or emulsion of the stabilizer directly with the polymer, or with a solution, suspension or emulsion of the same, and to eliminate the solvent thereafter.

The stabilizers of the invention may be used alone or in admixture with one or several of the stabilizers which are common in the processing of plastic materials, such as antioxidant agents on the basis of phenol and sulfide, UV-absorbers and light protecting agents, phosphite stabilizers, metal compounds, epoxy-stabilizers and polyhydric alcohols. In the plastic compositions to be stabilized there may also be present flame proofing agents and pigments, dyestuffs, antistatic agents and fillers, such as glass fibers.

Examples for appropriate antioxidant agents are those of the type of the sterically hindered phenols, such as 2,6-di-t.-butyl-p-cresol, 2,6-di-octadecyl-p-cresol, 4,4'-butylidene-bis-(2,6-di-t.-butyl-phenol), 4,4'-thio-bis-(2-t.-butyl-5-methyl-phenol), phenolic triazine compounds, thiodipropionic acid esters of fatty alcohols, dioctadecyl sulfide and -disufide.

The UV-absorbers and light protecting agents include, for example, 2-(2'-hydroxyphenyl)-benztriazoles, such as 2-(2'-hydroxy-5'-methylphenyl)-benztriazole, 2-hydroxybenzophenones, such as 2-hydroxy-4-octoxybenzophenone, stabilizers of the group of the salicylates, such as octylphenyl salicylate, nickel chelates, oxalic acid diamides and sterically hindered piperidine compounds.

As phosphites there are to be mentioned trisnonylphenyl phosphite, trislauryl phosphite or esters of pentaerythritol phosphite.

By metal compounds known as stabilizers there are to be understood in this respect: Calcium, barium, strontium, zinc, cadmium, magnesium, aluminium and lead soaps of aliphatic carboxylic acids or hydroxycarboxylic acids having from about 12 to 32 carbon atoms, salts of the aforesaid metals with aromatic carboxylic acids, such as benzoates or salicylates and also (alkyl-)phenolates of these metals, and also organo-tin compounds such as, for example, dialkyltin thioglycolates and carboxylates.

Known epoxy-stabilizers are, for example, epoxidized higher fatty acids, such as epoxidized soy bean oil, tall oil, linseed oil or epoxidized butyl oleate and also epoxides of long-chained olefins.

Polyhydric alcohols may be, for example, pentaerythritol, trimethylolpropane, sorbitol or mannitol, i.e. preferably alcohols having 5 to 6 carbon atoms and from 3 to 6 OH-groups.

An effective stabilizer combination for poly-α-olefins such as, for example, high, medium and low pressure polymers of $C_2$- to $C_4$-α-olefins, especially polyethylene and polypropylene or copolymers of such α-olefins, consists, calculated on 100 parts by weight of polymer, for example, of from 0.01 to 5 parts by weight of one of the compounds to be used in accordance with the invention, of from 0.5 to 5 parts by weight of a phenolic stabilizer, optionally of from 0.01 to 5 parts by weight of a sulfur-containing costabilizer, and optionally of from 0.01 to 3 parts by weight of a basic or neutral metal soap such as, for example, calcium stearate or zinc stearate, and optionally of from 0.1 to 5 parts by weight of a phosphite and optionally of from 0.01 to 5 parts by weight of a known UV-stabilizer of the group of alkoxy-hydroxy-benzophenones, hydroxyphenyl-benztriazoles, benzylidene-malonic acid-mononitrile esters or the so-called quenchers, such as nickel chelates.

The following Examples serve to illustrate the process for the preparation of the novel compounds, as well as the excellent action of the same as light protecting agents for plastic compositions.

EXAMPLE 1

N-t.-butyl-N'-(1,3,5-triaza-adamantyl)-urea

At room temperature, a solution of 9.8 g (0.1 mole) of t.-butyl-isocyanate in 40 ml of absolute toluene is added dropwise, while stirring, to a solution of 15.4 g (0.1 mole) of 7-amino-1,3,5-triaza-adamantane in 60 ml of absolute toluene. The mixture is continued to be stirred for 5 hours, and the crystal mass having been formed is filtered off with suction. Subsequently it is dissolved and recrystallized from acetone and ethanol. Yield: 20 g of white crystals, m.p. 288° C. (decomp.).

EXAMPLES 2 to 7

According to a method analogous to the one of Example 1, the following compounds are prepared, while using each time 0.1 mole of 7-amino-1,3,5-triaza-adamantane and the equivalent amount of isocyanate:

| Example No. | Isocyanate | Product Yield (% of the theory) | cryst. from | m.p. (°C.) |
|---|---|---|---|---|
| 2 | cyclohexyl- | N-cyclohexyl-N'-(1,3,5-triaza-adamantyl)-urea 80% | toluene/ methanol | 291 |
| 3 | n-octadecyl- | N-octadecyl-N'-(1,3,5-triaza-7-adamantyl)-urea 75% | acetone/ ethanol | 103 |
| 4 | 3-chlorophenyl- | N-3-chlorophenyl-N'-(1,3,5-triaza-7-adamantyl)-urea 95% | acetone/ ethanol | 257 |
| 5 | 4-chlorophenyl- | N-4-chlorophenyl-N'-(1,3,5-triaza-adamantyl)-urea 90% | ethylacetate/ ethanol | 247 |
| 6 | β-naphthyl- | N-β-naphthyl-N'-(1,3,5-triaza-7-adamantyl)-urea 70% | isopropanol | 269 |
| 7 | hexamethylene-di- | N-hexane-1',6',-bis-(7-carbamoyl-1,3,5-triaza-adamantylamine-7) 60% | — | 253 |

EXAMPLE 8

This Example shows the light-stabilizing action of the compounds of the invention when used in a poly-α-olefin.

100 Parts by weight of polypropylene having a melting index i₅ of about 6 g/10 min. (determined according to ASTM D 1238-62 T) and a density of 0.96 were mixed with 0.10 part by weight of pentaerythrityltetrakis[3-(3,5-di-tert.-butyl-4-hydroxyphenyl)-propionate], 0.20 part by weight of calcium stearate and 0.30 part by weight of one of the compounds according to the invention each time and were homogenized on a two-roller mill at 200° C. for 5 minutes. The plastics melt was then pressed at 200° C. to form a plate having a thickness of 1 mm. Test specimens were stamped out in accordance with DIN 53455 from the cold plate. The test specimens required as samples for comparison were made in an analogous manner, however, without using the stabilizer to be tested.

For determining the stability to light the test samples were subjected to irradiation with alternating light on a ®Xenotest-150 apparatus of the firm Original Hanau Quarzlampen GmbH. The irradiation intensity was modulated by 6 infra-red windows and 1 ultraviolet window (DIN 53387). The exposure time was measured in hours (=period of resistance) after which the absolute elongation at tear has decreased to 10%. The elongation at tear was determined on a tensile testing machine of the firm Instron at a draw-off speed of 5 cm per minute.

| Stabilizer according to Example | Period of resistance (hours) |
|---|---|
| 2 | 1 000 |
| 4 | 1 000 |
| none | 550 |

What is claimed is:

1. Process for the stabilization of halogen-free or halogen-containing synthetic polymers to the degradation by light and heat, which comprises adding to the polymers as stabilizing agent from 0.01 to 5.0 parts by weight, calculated on 100 parts by weight of the polymer, of a 1,3,5-triaza-7-adamantanyl urea of the formula

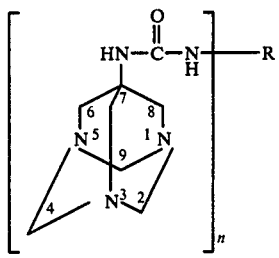

(I)

in which n is 1 or 2 and R represents a mono- or bivalent hydrocarbon radical, depending on the meaning of n, which may be:
(a) an alkyl radical having from 1 to 20 carbon atoms or an alkylene radical having from 2 to 20 carbon atoms, or
(b) an alkenyl radical having from 3 to 20 carbon atoms, or
(c) a cycloalkyl radical having from 5 to 14 carbon atoms which may be substituted by halogen, $C_1$–$C_{12}$ alkyl, or an alkoxy group having from 1 to 4 carbon atoms, or
(d) an aryl or arylene radical with 6 or 10 carbon atoms, which may be substituted by halogen, $C_1$–$C_{12}$ alkyl, or an alkoxy group of from 1 to 4 carbon atoms, or
(e) an aralkyl or aralkylene radical of from 7 to 18 carbon atoms.

2. Process as claimed in claim 1, which comprises using those 1,3,5-triaza-7-adamantanyl ureas of the formula I in which the radical R represents, if n is 1, t.-butyl, cyclohexyl, n-octadecyl, 3-chlorophenyl, 4-chlorophenyl, β-naphthyl and represents hexamethylene, if n is 2.

3. Plastic compositions on the basis of halogen-free or halogen-containing synthetic polymers, which contain as stabilizer against UV degradation one of the compounds used according to claim 1 in an amount of from 0.01 to 5.0 parts by weight, calculated on 100 parts by weight of polymer.

4. Plastic compositions as claimed in claim 3, in which the synthetic polymer is polyethylene or polypropylene.

5. 1,3,5-triaza-7-adamantanyl ureas of the formula

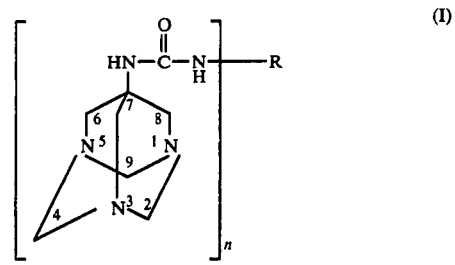

(I)

in which n is 1 or 2 and represents a mono- or bivalent hydrocarbon radical, depending on the meaning of n, which may be:
(a) an alkyl radical having from 1 to 20 carbon atoms or an alkylene radical having from 2 to 20 carbon atoms, or
(b) an alkenyl radical having from 3 to 20 carbon atoms, or
(c) a cycloalkyl radical having from 5 to 14 carbon atoms which may be substituted by halogen, $C_1$–$C_{12}$ alkyl, or an alkoxy group having from 1 to 4 carbon atoms, or
(d) an aryl or arylene radical with 6 or 10 carbon atoms, which may be substituted by halogen, $C_1$–$C_{12}$ alkyl, or an alkoxy group of from 1 to 4 carbon atoms, or
(e) an aralkyl or aralkylene radical of from 7 to 18 carbon atoms.

* * * * *